United States Patent
Kin et al.

(10) Patent No.: US 6,834,543 B2
(45) Date of Patent: Dec. 28, 2004

(54) UNDERINFLATION DETECTOR AND METHOD OF CORRECTING OUTPUT OF SENSOR USING THE SAME

(75) Inventors: Keiyu Kin, Wako (JP); Osamu Yano, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/676,606

(22) Filed: Oct. 1, 2003

(65) Prior Publication Data

US 2004/0079145 A1 Apr. 29, 2004

(30) Foreign Application Priority Data

Oct. 29, 2002 (JP) ........................................ 2002-314197

(51) Int. Cl.[7] ........................ G01M 17/02; B60C 23/00
(52) U.S. Cl. ........................................ 73/146; 340/444
(58) Field of Search .............................. 73/146, 146.5; 340/443, 444

(56) References Cited

U.S. PATENT DOCUMENTS 5,327,116 A * 7/1994 Davidson .................... 340/443

FOREIGN PATENT DOCUMENTS

JP 49-85701 8/1974
JP 06-092114 4/1994

* cited by examiner

Primary Examiner—William Oen
(74) Attorney, Agent, or Firm—Merchant & Gould P.C.

(57) ABSTRACT

A four-wheel vehicle is equipped with rotational speed sensors S1–S4 that detect a rotational speed V1 of a left front wheel T1, a rotational speed V2 of a right front wheel T2, a rotational speed V3 of a left rear wheel T3 and a rotational speed V4 of a right rear wheel T4, respectively, and a yaw rate sensor Sγ that detects a yaw rate of the vehicle. An underinflation detector 1 includes a controller 2 that calculates a front-wheel yaw rate γF derived from a difference in rotational speed between the front wheels T1, T2, a rear-wheel yaw rate γR derived from a difference in rotational speed between the rear wheels T3, T4, and deviations of the yaw rates γF, γR from an actually measured value output from the yaw rate sensor Sγ. A rate of change of the deviation with respect to change of vehicle speed is determined to thereby detect insufficiency of inflation pressure of tires with high reliability. Utilizing this underinflation detector 1, the outputs of the yaw rate sensor Sγ can be corrected.

4 Claims, 5 Drawing Sheets

TO FIG.4B

UNDERINFLATION DETECTOR AND METHOD OF CORRECTING OUTPUT OF SENSOR USING THE SAME

BACKGROUND OF THE INVENTION

This invention relates to an underinflation detector and a method of correcting an output of a sensor using the same.

In order to achieve stable driving of a vehicle, a variety of systems have been developed, such as antilock brake systems and systems for detecting loss or insufficiency of inflation pressure of tires. Typically, these systems include sensors for detecting a speed, a yaw rate, and the like of the vehicle, and perform prescribed arithmetical operations to exercise auxiliary or active control over behavior of the vehicle.

The systems for detecting insufficiency of inflation pressure (underinflation) of tires fall roughly into two approaches: one that detects inflation pressure directly by a pressure sensor attached to each tire; and the other that determines change in inflation pressure from a difference in rotational speeds of tires by making use of outside diameters of the tires which changes in accordance with change in the inflation pressure. The approach that determines change in inflation pressure from differences in rotational speeds of the tires has an advantage that a rotational speed sensor attached to the tire for the antilock brake system or the like in ordinary vehicles can be used to construct the system.

Among techniques for detecting insufficiency of inflation pressure through the latter approach in which difference in rotational speeds of the tires is utilized is, for example, a method adopted by an apparatus disclosed in JP 49-85701 A in which the sum of the numbers of revolutions per unit time of the left front wheel and the right rear wheel is calculated, the sum of the numbers of revolutions per unit time of the right front wheel and the left rear wheel is calculated, and the sums of the numbers of revolutions per unit time as thus calculated are compared. This apparatus can accordingly achieve improved accuracy of detection by offsetting the difference in the numbers of revolutions per unit time between the right wheel and the left wheel which arises while a vehicle makes a turn in a curved road, and the difference in the numbers of revolutions per unit time between the front wheel and the rear wheel which is derived from the difference between the driving wheel and the wheel driven by the driving wheel.

Another technique for detecting insufficiency of inflation pressure through the approach in which difference in rotational speeds of the tires is utilized is disclosed in JP 6-92114 A, in which a control unit is programmed so as not to detect the difference in the rotational speeds of the tires in transient states of behavior of the vehicle, for example, where the vehicle drives at a very low speed, or the speed of the vehicle increases or decreases suddenly, or the vehicle undergoes a great lateral acceleration. Thus-configured apparatus can accordingly prevent a possible error in detection, thereby increasing reliability.

However, according to the underinflation detector as described above in which comparison is made between the sum of the numbers of revolutions per unit time of the left front wheel and the right rear wheel and the sum of the numbers of revolutions per unit time of the right front wheel and the left rear wheel, when tires of the two wheels at the same sides (i.e., the front and rear right wheels, or the front and rear left wheels) undergo decrease of inflation pressure at the same time, the sums for use in the above comparison would both be affected by insufficiency of inflation pressure, and thus could possibly make no significant difference as a result of the arithmetical operation. Therefore, accurate detection cannot be achieved by the above underinflation detector for some particular cases. Further, there is an increasing demand of detection with higher precision, even when only a tire of one wheel is underinflated.

On the other hand, sensors for determining stability of behavior of a driving vehicle could be affected by torque applied on attachment, change with passage of time, temperature change, and the like, so that a measurement would involve an offset. Since the sensors used in the aforementioned systems should constantly output an accurate value in order to ensure that stable driving of the vehicle will be achieved, the output of the sensors may preferably be corrected as necessary, so that no offset is involved.

In view of the circumstances as described above, the present invention has been made to address the above disadvantages. It is thus an exemplary general object of the present invention to provide means for detecting insufficiency of inflation pressure of tires of a vehicle with high reliability. Another exemplary object of the present invention is to provide means for correcting the output of a prescribed sensor by making use of the inventive means for detecting insufficiency of inflation pressure of tires of a vehicle.

SUMMARY OF THE INVENTION

An underinflation detector for a four-wheeled vehicle provided according to one aspect of the present invention includes: a driving direction sensor that detects a direction of movement of the vehicle and outputs a detected value as a first value of a parameter related to the direction of movement of a vehicle; a rotational speed sensor that detects rotational speeds of wheels of the vehicle; and a controller that determines from outputs of the driving direction sensor and the rotational speed sensor whether inflation pressure of a tire of any of the wheels has decreased. The controller obtains the first value of the parameter from the driving direction sensor, calculates a second value of the parameter from a difference between rotational speeds of the front wheels, calculates a third value of the parameter from a difference between rotational speeds of the rear wheels, calculates a rate of change of deviation of the second value from the first value with respect to change of vehicle speed by the least-squares method, calculates a rate of change of deviation of the third value from the first value with respect to change of the vehicle speed by the least-squares method, and if at least one of the rates of change of deviation exceeds a prescribed threshold, determines that inflation pressure of a tire of at least one of the wheels has decreased.

The above underinflation detector utilizes three values of a parameter related to the direction of movement of a vehicle, among which the first value is an actually measured value detected by the driving direction sensor, the second and third values are calculated from the difference between rotational speeds of the front wheels and from the difference between rotational speeds of the rear wheels, respectively. In operation, comparison is made between the first value and the second value to detect insufficiency of inflation pressure of tires of the front wheels, and comparison is made between the first value and the third value to detect insufficiency of inflation pressure of tires of the rear wheels. To be specific, for the tires of the front wheels, the deviation of the second value from the first value and the vehicle speed determined at a time when the deviation is observed are paired as a data unit, and a plurality of such data units are obtained to apply the least-squares method, by which a rate of change of deviation with respect to change of the vehicle speed is calculated. Similarly, for the tires of the rear wheels, a rate of change of deviation of the third value from the first value with respect to change of the vehicle speed is calculated by the least-squares method. Thus-obtained rates of change of the deviation each indicate a tendency of the difference of the rotational speeds between the right and left (front or rear) wheels, and thus if any of the rates of change of the deviation exceeds a prescribed threshold, it is determined that the inflation pressure of a tire of at least one of the wheels has decreased. Since detection of insufficiency of inflation pressure of tires of the front wheels and detection of insufficiency of inflation pressure of tires of the rear wheels can be made independently by comparison with actually measured values, detection can occur without fail even when the inflation pressure of only one tire among four has decreased, and even when the inflation pressure of tires of the two wheels at the same sides (i.e., the front and rear right wheels, or the front and rear left wheels) have decreased at the same time.

In the above arrangement, the deviations may preferably be modified by being weighted by normalized values of indicators of straight-ahead driving of the vehicle and taking moving averages thereof before the rates of change of the deviation are calculated with respect to change of the vehicle speed by the least-squares method.

The above modification utilizes normalized values of the indicators of straight-ahead driving of the vehicle to weight the deviations, which are in turn moving-averaged to produce a preferable determination result. In a case where the vehicle is cornering, or others, there is a high probability that a difference should arise between rotational speeds of the right and left wheels; thus, the deviations calculated in such a case are weighted, and then the moving averages of the weighted deviations are taken, so as to reduce the degree of contribution thereof to the determination of significant decrease in inflation pressure of tires. Consequently, only the difference between the rotational speeds of the wheels caused by the decrease in inflation pressure of tires during straight-ahead driving of the vehicle is relied on in detecting insufficiency of inflation pressure of the tires.

The above parameter related to the direction of movement of the vehicle may preferably be selected from the group consisting of a yaw rate, a steering angle, and a lateral acceleration.

The underinflation detector utilizing a yaw rate, a steering angle or a lateral acceleration as a parameter related to the direction of movement of the vehicle, and comparison is made between an actually measured value and calculated value for the front or rear wheel to detect insufficiency of inflation pressure of the tires. The parameter is indicative of a deviation of the direction of movement of each wheel from the straight-ahead driving of the vehicle, and thus serves to detect any imbalance in rotational speed between the front wheels or between the rear wheels. Since it is understood that such imbalance in rotational speed should be derived from decrease of inflation pressure of tires, the insufficiency of inflation pressure of tires of the front or rear wheels can be detected by using these parameters.

In another aspect of the present invention, there is provided a sensor output correcting method using the underinflation detector as above, which includes the steps of: calculating a first offset value of outputs of the driving direction sensor from a relation obtained by the least-squares method between the deviation of the second value from the first value and the vehicle speed; calculating a second offset value of the outputs of the driving direction sensor from a relation obtained by the least-squares method between the deviation of the third value from the first value and the vehicle speed; and obtaining from the first offset value and the second offset value a correction value to be added to the outputs of the driving direction sensor.

Various sensors are used to ensure that stable driving of the vehicle will be achieved, and among them is a driving direction sensor which is used to detect a driving direction of the vehicle. The above method is configured to correct a possible deviation of the output of this driving direction sensor from a true value, and to thereby obtain an adequate value from the output of the driving direction sensor. It is understood that as long as the inflation pressure of each tire has not decreased and no deviation exists in the output of the driving direction sensor, the relation between the deviation and the vehicle speed calculated by the least-squares method should exhibit a curve in which the deviation=0 if the vehicle speed=0. However, in some instances, the deviation has a specific value more than 0 even when the vehicle speed=0, and it is understood that the specific value (as an intercept of the deviation curve) indicates an offset value of the driving direction sensor.

Other advantages and further features of the present invention will become readily apparent from the following description of preferred embodiments with reference to accompanying drawings.

DETAILED DESCRIPTION OF THE PREFERRED EMBODIMENTS

Figure 1:
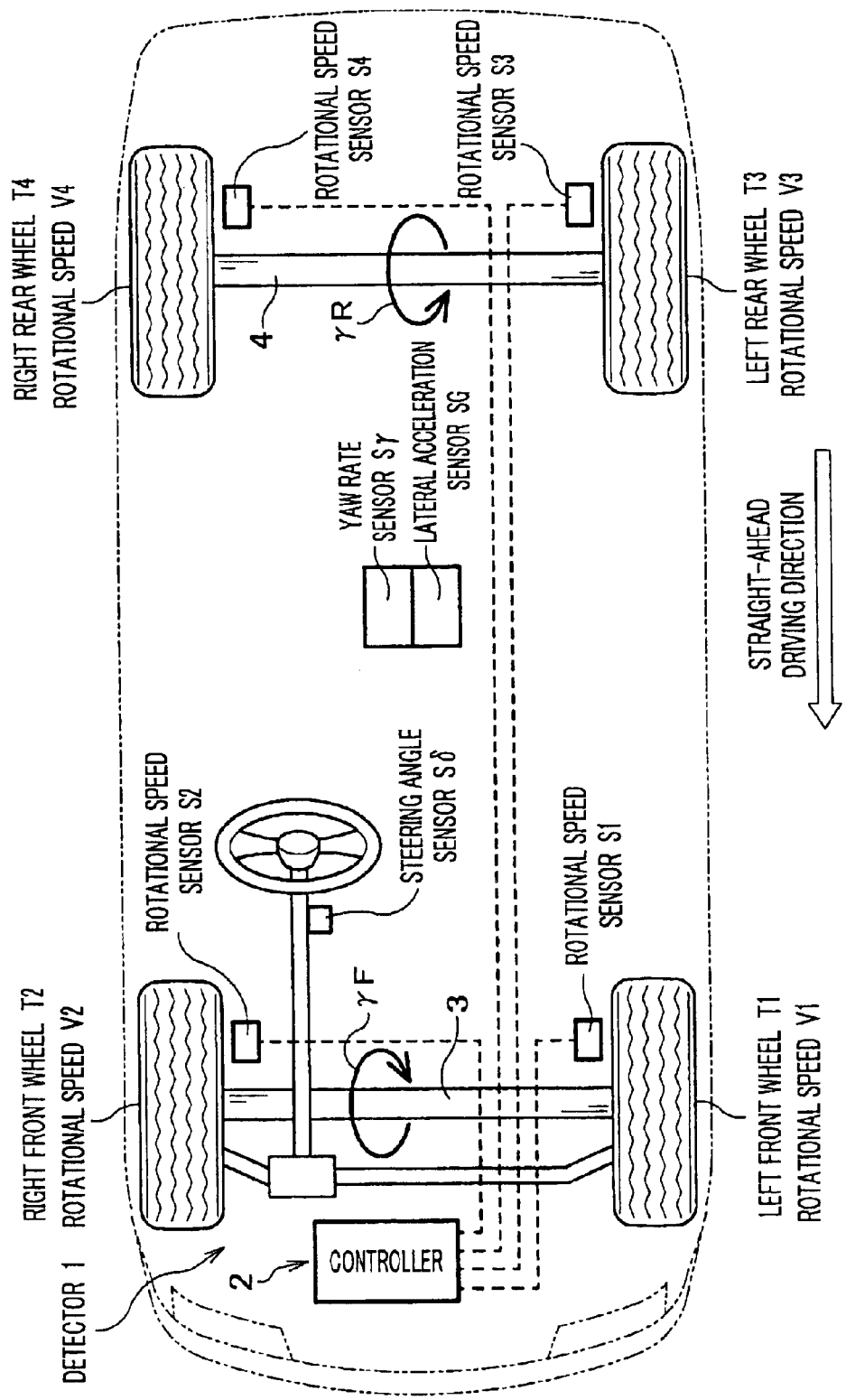
FIG. 1 is a schematic diagram illustrating an arrangement of an underinflation detector according to one exemplified embodiment of the present invention.

First, a description will be given of an outline of determination of insufficiency of inflation pressure of tires of a vehicle adopted in an underinflation detector 1 according to one exemplified embodiment of the present invention with reference to FIG. 1. The vehicle is provided with four wheels T1–T4. Rotational speed sensors S1–S4 are provided in the vehicle near the left front wheel T1, the right front wheel T2, the left rear wheel T3 and the right rear wheel T4, respectively, to detect the rotational speeds V1–V4 of the corresponding wheels T1–T4. A yaw rate sensor Sγ is also provided in the vehicle, so as to detect a yaw rate of the vehicle.

As inflation pressure of the tire provided in one wheel decreases, the diameter of the wheel is reduced and the rotational speed thereof increases accordingly. Therefore, a yaw rate of the front wheels (front-wheel yaw rate γF) which is caused by a difference between rotational speeds V1, V2 of the front wheels T1 and T2 is compared with an output of the yaw rate sensor Sγ, to detect insufficiency of inflation pressure of the tires of the front wheels T1, T2. Similarly, a yaw rate of the rear wheels (rear-wheel yaw rate γR) which is caused by a difference between rotational speeds V3, V4 of the rear wheels T3 and T4 is compared with an output of the yaw rate sensor Sγ, to detect insufficiency of inflation pressure of the tires of the rear wheels T3, T4. As a result, the insufficiency of inflation pressure of the tires of the front wheels T1, T2 and the insufficiency of inflation pressure of the tires of the rear wheels T3, T4 can be evaluated independently. Accordingly, the insufficiency of inflation pressure of one wheel can be detected adequately, and the insufficiency of inflation pressure of two wheels at the same sides (i.e., the front and rear right wheels, or the front and rear left wheels) can be detected adequately. Moreover, as will be described later in detail, a correction value to be added to the outputs of the yaw rate sensor Sγ can be obtained in the course of the detection of insufficiency of inflation pressure made by the underinflation detector 1 according to the present invention.

A description will now be given of an arrangement of the underinflation detector 1. In the underinflation detector 1, the yaw rate of the vehicle is detected by the yaw rate sensor Sγ, the rotational speeds V1–V4 of the wheels T1–T4 are detected by the rotational speed sensors S1–S4, and a controller 2 comprised of an electronic control unit or ECU uses the outputs of the yaw rate sensor Sγ and the rotational speed sensors S1–S4 to execute various processes, to determine the insufficiency of inflation pressure of the tires of the wheels, and to calculate an offset value of the outputs of the yaw rate sensor Sγ. The rotational speed sensors S1–S4 and the controller 2 may be implemented by making use of components available in the antilock brake system or the driving force control system for exercising traction control. To be more specific, a program for detection of insufficiency of inflation pressure is installed in the ECU of these systems to perform functions of the controller 2. It is however to be understood that a separate control unit may be provided instead as appropriate. Upon detection of insufficiency of inflation pressure of any of the tires of the wheels, the determination result is output through an instrument panel (not shown) of the vehicle, so that a driver of the vehicle is notified thereof.

Sensors of various types known in the art may be used for the rotational speed sensors S1–S4. Among sensors usable for the rotational speed sensors S1–S4, for example, is a sensor that includes a permanent magnet and an induction coil and detects magnetic flux varying between a plurality of teeth formed along a periphery of a rotor interlocked and thus revolving synchronously with an axle shaft. The teeth on the rotor are evenly spaced apart from each other with a prescribed pitch, and as the axle shaft rotates, the projecting teeth move closer to and away from the rotational speed sensor S1–S4 periodically in accordance with the rotational speed of the axle shaft. Accordingly, the magnetic flux generated by the permanent magnet also varies periodically at the same regular intervals, which produces a periodical variation of voltage directly proportional to the variation of the magnetic flux in the induction coil. In other words, the rotational speed sensors S1–S4 each output a voltage signal having a frequency according to the rotational speed of the axle shaft. It is understood that any other type of sensors may be employed for the rotational speed sensors S1–S4, such as a sensor utilizing the Hall effect, a sensor utilizing laser light, etc.

Figure 2:
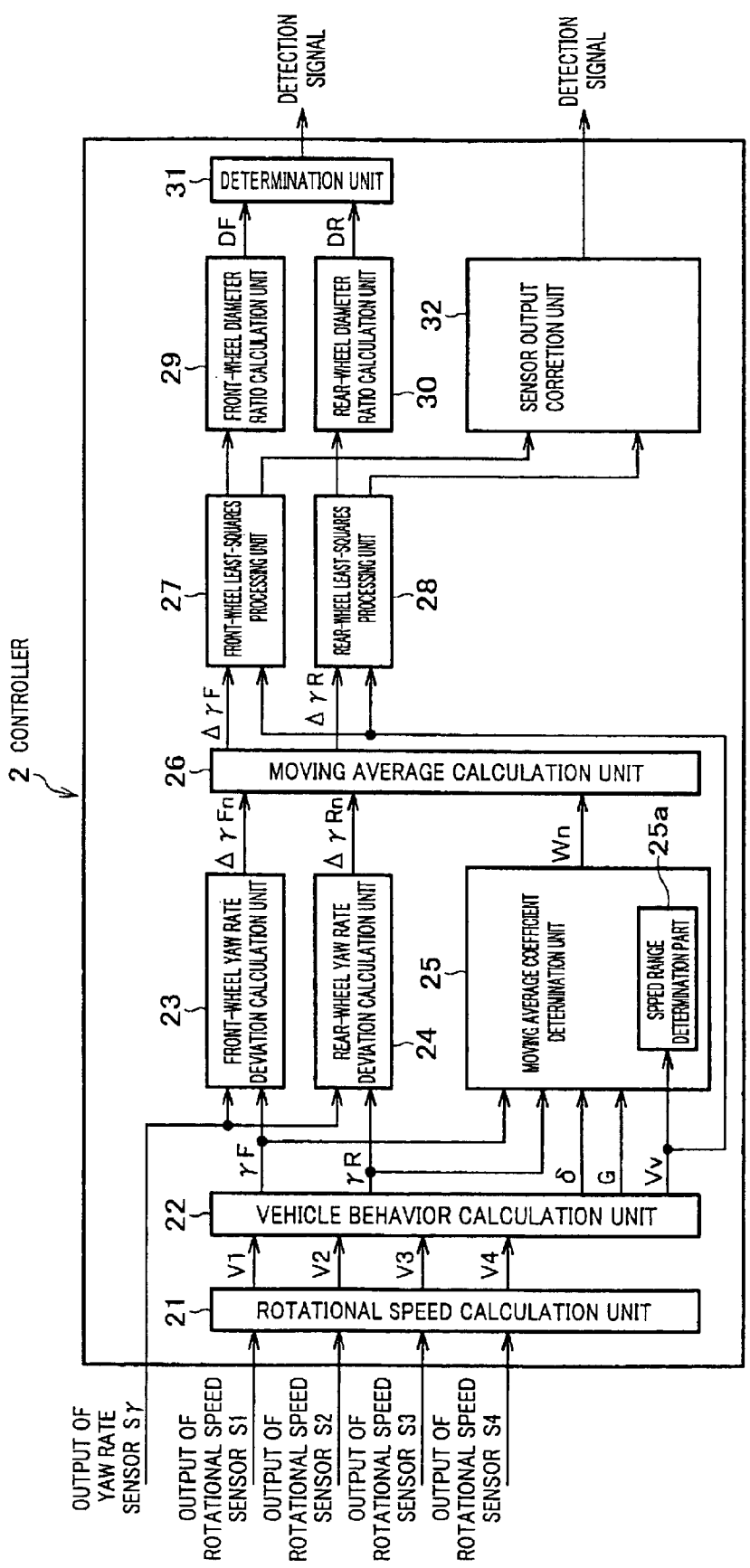
FIG. 2 is a block diagram of a controller provided in the underinflation detector as shown in FIG. 1.

The controller 2 includes a CPU, a RAM, a ROM and other necessary components, and is configured to execute various processes. Functional units related to detection of underinflation and correction of an output of the yaw rate sensor Sγ according to the present embodiment are extracted from entire functionality of the versatile controller 2 and illustrated in a block diagram of FIG. 2. As shown in FIG. 2, the controller 2 obtains an output of the yaw rate sensor Sγ and outputs of the rotational speed sensors S1–S4, and calculates a front-wheel yaw rate γF (yaw rate for the front wheels T1, T2) and a rear-wheel yaw rate γR (yaw rate for the rear wheels T3, T4). The controller 2 then makes various comparisons as necessary to determine whether inflation pressure of tires of any of the wheels has decreased, and outputs the determination results (the foregoing process is referred to as detection of underinflation). Further, the controller 2 determines a correction value to be added to the output of the yaw rate sensor Sγ based on data obtained through the above process.

To be more specific, the controller 2 includes a rotational speed calculation unit 21, a vehicle behavior calculation unit 22, a front-wheel yaw rate deviation calculation unit 23, a rear-wheel yaw rate deviation calculation unit 24, a moving average coefficient determination unit 25, a moving average calculation unit 26, a front-wheel least-squares processing unit 27, a rear-wheel least-squares processing unit 28, a front-wheel diameter ratio calculation unit 29, a rear-wheel diameter ratio calculation unit 30, a determination unit 31, and a sensor output correction unit 32.

The rotational speed calculation unit 21 calculates rotational speeds V1–V4 of the front wheels T1, T2 and the rear wheels T3, T4 from the outputs of the rotational speeds sensors S1–S4. The vehicle behavior calculation unit 22 calculates various parameters indicative of vehicle behavior, which parameters include a front-wheel yaw rate γF, a rear-wheel yaw rate γR, a vehicle speed Vv, an estimated steering angle δ, and an estimated lateral acceleration G. The vehicle speed Vv takes the mean value of the rotational speeds V1–V4. The front-wheel yaw rate γF, rear-wheel yaw rate γR, estimated steering angle δ, and estimated lateral acceleration G are obtained through a process which includes: calculating a front-wheel speed difference from the rotational speed V1 and the rotational speed V2 and a rear-wheel speed difference from the rotational speed V3 and the rotational speed V4 using a comparator; and performing an arithmetical operation such as multiplying the front-wheel speed difference by a prescribed value and the rear-wheel speed difference by another prescribed value, respectively.

The front-wheel deviation calculation unit 23 calculates a front-wheel yaw rate deviation ΔγFn from the front-wheel yaw rate γF and a measured value of the yaw rate sensor Sγ. The front-wheel yaw rate deviation ΔγFn takes an integral obtained by summing up yaw rate deviations each corresponding to unit process time a specific number of times (a prescribed number of times N1; e.g., the number of times equivalent to a one-second period of time) in order to prevent a minor error from being introduced. An integral is taken for the above calculation of the front-wheel yaw rate deviation ΔγFn because of a possible limitation placed on the processing speed and/or memory space available, but, instead, an average for a specific period of time may be taken if circumstances permit.

The rear-wheel deviation calculation unit 24 calculates a rear-wheel yaw rate deviation ΔγRn from the rear-wheel yaw rate γR and a measured value of the yaw rate sensor Sγ. The rear-wheel yaw rate deviation ΔγRn also takes an integral obtained by summing up yaw rate deviations each corresponding to unit process time a specific number of times (a prescribed number of times N1; e.g., the number of times equivalent to a one-second period of time) in order to prevent a minor error from being introduced. An integral is taken for the above calculation of the rear-wheel yaw rate deviation ΔγRn for the same reasons as described above in relation to the calculation of the front-wheel yaw rate deviation ΔγFn.

The moving average coefficient determination unit 25 determines a moving average coefficient Wn from parameters calculated in the above vehicle behavior calculation unit 22, i.e., front-wheel yaw rate γF, rear-wheel yaw rate γR, estimated steering angle δ, estimated lateral acceleration G, and vehicle speed Vv.

In the first place, there is provided a map which is looked up to locate a normalized value (or a normal; e.g., between 0 and 1) for each parameter of the front-wheel yaw rate γF, rear-wheel yaw rate γR, estimated steering angle δ and estimated lateral acceleration G. The parameters are converted to normalized values using the respective maps, and thus-obtained normalized values are compared with each other to set the moving average coefficient Wn at the smallest among the normalized values. Assuming for example that the normalized value of the estimated steering angle δ is "0.2"; the normalized value of the lateral acceleration G is "0.1"; and normalized values of the other parameters are all "0.3", the smallest normalized value "0.1" is assigned to the moving average coefficient Wn. Assuming instead that the smallest normalized value is "0.7", this value "0.7" is assigned to the moving average coefficient Wn. The parameters as referenced hereupon are each indicative of a driving direction of the vehicle, and thus the moving average coefficient Wn determined by the parameters serves to indicate the behavior of the vehicle such that the larger the coefficient Wn, the more likely the vehicle is driving in the straight-ahead direction, while the smaller the coefficient Wn, the more the vehicle deviates from the straight-ahead driving direction.

Moreover, the moving average coefficient determination unit 25 includes a speed range determination part 25a in which the vehicle speed Vv calculated at the same time when the parameters used to determine the moving average coefficient Wn are calculated is used to correct the moving average coefficient Wn. To correct the moving average coefficient Wn, the speed range determination part 25a has a plurality of counters corresponding to a plurality of speed ranges into which possible vehicle speeds are divided as appropriate, e.g., in every 10 km/h. The speed range determination part 25a determines which speed range the vehicle speed Vv calculated at the time when the parameters used to determine the moving average coefficient Wn are calculated falls within. If a counter (and a value held in a data field for the counter) corresponding to that speed range is indicative of a "data-acquisitive" condition, the moving average coefficient Wn as uncorrected is output, and the counter increments the value in the data field therefor. On the other hand, if the counter is indicative of a "non-data-acquisitive" condition, the moving average coefficient Wn is corrected to "0" (zero). The moving average coefficient Wn is corrected to more accurately calculate a rate of change of the yaw rate deviations ΔγFn, ΔγRn with respect to change of the vehicle speed Vv, or other values in downstream stages (which will be discussed later in detail in conjunction with the least-squares estimates performed in the least-squares processing units 27, 28), and more particularly for the purpose of acquiring data (parameters) covering as wide a variety of speed ranges as possible required for the accurate calculation of the values. It is understood that various criteria may be available to determine whether a specific counter contains data indicative of the "data-acquisitive" condition or data indicative of the "non-data-acquisitive" condition. For example, all the counters may be set as indicative of the "data-acquisitive" condition in the initial state, the counter is turned into the "non-data-acquisitive" condition once data are acquired when the vehicle speed Vv falls within the speed range corresponding to the counter, and all the counters are reset to zero once data are acquired when the vehicle speed Vv falls within a speed range other than any speed ranges corresponding to "non-data-acquisitive" counters or counters adjacent to the "non-data-acquisitive" counters. With this criterion or others as adequately applied, data covering a wide variety of speed ranges can be acquired in a simple and easy manner.

The moving average calculation unit 26 determines the tendency of change of the yaw rate deviations ΔγFn, ΔγRn represented when the vehicle is steadily driving straight ahead, using the method of moving averages. The method of moving averages is one example of the processes for determining change of a state by finding a tendency of a plurality of data obtained in a time series. To be more specific, each of the front-wheel yaw rate deviation ΔγFn and the rear-wheel yaw rate deviation ΔγRn is weighted by the moving average coefficient Wn calculated in the same period of time, and an integral is evaluated by summing up the weighted yaw rate deviations a prescribed number of times N2 (e.g., the number of times equivalent to a twenty-second period of time). The integral may be divided by the number of integrations n to take an average if circumstances could permit; in the present embodiment, however, the integral is output to a subsequent process for purposes of processing speed improvement and/or memory space saving.

In the method of moving averages, for cases where the yaw rate deviations ΔγFn, ΔγRn are large, if the moving average coefficient Wn is small, then the integral becomes small, while if the moving average coefficient Wn is large, then the integral becomes large. For cases where the yaw rate deviations ΔγFn, ΔγRn are small, if the moving average coefficient Wn is small, then the integral becomes small, while if the moving average coefficient Wn is large, then the integral becomes relatively large. In other words, when the moving average coefficient Wn is small, it is understood that the vehicle is not driving straight ahead, and thus change in yaw rate deviations ΔγFn, ΔγRn is modified so as not to affect the detection result much. On the other hand, when the moving average coefficient Wn is large, it is determined that the vehicle is driving nearly straight ahead, and thus detected value is weighted so that the change in yaw rate deviations ΔγFn, ΔγRn affects the detection result much. Hereupon, because the integral is taken, even if the moving average coefficient Wn is relatively a small value, the yaw rate deviations ΔγFn, ΔγRn continuously exhibiting a specific value for a long time would affect the detection result.

Figure 3:
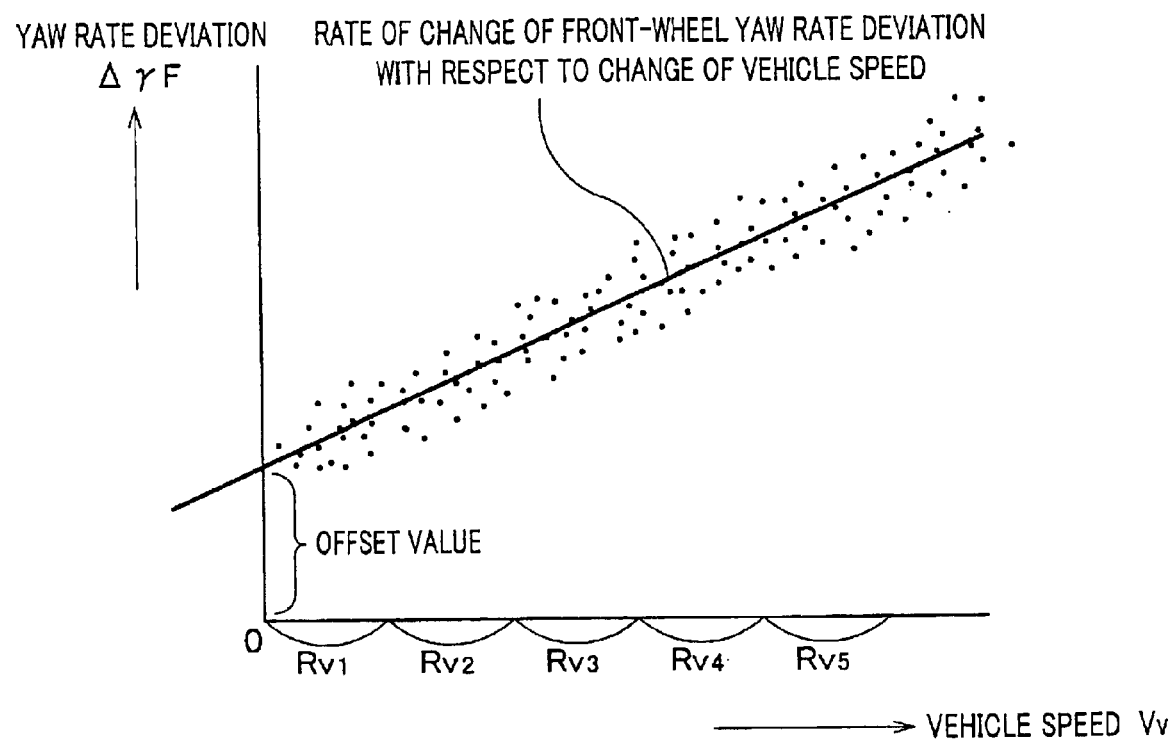
FIG. 3 is a diagram illustrating least-squares estimates obtained by the least-squares method applied in the present embodiment.

The front-wheel least-squares processing unit 27 calculates an inclination and an intercept of a relation between the front-wheel yaw rate deviation ΔγFn and the vehicle speed Vv by the method of least squares, assuming that the relation shows a linear system. For example, as shown in FIG. 3, where the abscissas denote vehicle speeds Vv and the ordinates denote front-wheel yaw rate deviation ΔγFn, the inclination indicates the rate of change of the front-wheel yaw rate deviation ΔγFn with respect to change of the vehicle speed Vv, and the intercept of the axis of abscissas indicates an offset of an output of the yaw rate sensor Sγ.

Similarly, the rear-wheel least-squares processing unit 28 calculates an inclination and an intercept from the rear-wheel yaw rate deviation ΔγRn and the vehicle speed Vv by the method of least squares. For example, the inclination indicates the rate of change of the rear-wheel yaw rate deviation ΔγRn with respect to change of the vehicle speed Vv, and the intercept of the axis of abscissas indicates an offset of the output of the yaw rate sensor Sγ.

The process of the above speed range determination part 25a will be described with reference to FIG. 3. Assuming that the moving average coefficient determination unit 25 have acquired data (front-wheel yaw rate ΔγFn) for use in the least-squares processing unit 27 when the vehicle speed Vv falls within a vehicle speed range Rv1, s the next data is acquired for use in the least-squares processing unit 27 if it is received when the vehicle speed Vv falls within any of vehicle speed ranges Rv2 through Rv5, but is not used if it is received when the vehicle speed Vv falls within the vehicle speed range Rv1 again. If vehicle speed Vv falls within any of the vehicle speed ranges Rv3 through Rv5, the counters are all reset to enable the moving average coefficient determination unit 25 to acquire data for use in the least-squares processing unit 27 regardless of which vehicle speed range the vehicle speed Vv falls within. In FIG. 3, a plurality of values (data corresponding to the front-wheel yaw rate ΔγFn) are plotted within each of the vehicle speed ranges Rv1 through Rv5; however, not every data should be held in a memory (e.g., RAM) as the case may be, but the maximum value data for each vehicle speed range Rv1–Rv5, for example, may only be held in the RAM, and used and subjected to the least-squares processing.

The present embodiment employs the least-squares method, and thus even if data obtained for a period of time are subject to variation, the rates of change of the yaw rate deviations ΔγFn, ΔγRn, and the offset can be obtained with high precision. In particular, the moving average coefficient Wn is modified as described above using the vehicle speed ranges to allow the data to distribute extensively over a plurality of vehicle ranges, and thus each value of the inclination (rate of change of yaw rate deviation) and the intercept (offset of output of the yaw rate sensor Sγ) obtained by the least-squares method is optimally adjusted so as to insure high reliability.

The front-wheel diameter ratio calculation unit 29 multiplies the rate of change of the yaw rate deviation ΔγFn with respect to change of the vehicle speed Vv output from the front-wheel least-squares processing unit by a prescribed wheel speed conversion coefficient, to calculate a diameter ratio DF of the front wheels T1, T2.

The rear-wheel diameter ratio calculation unit 30 multiplies the rate of change of the yaw rate deviation ΔγRn with respect to change of the vehicle speed Vv output s from the rear-wheel least-squares processing unit 28 by a prescribed wheel speed conversion coefficient, to calculate a diameter ratio DR of the rear wheels T3, T4.

The determination unit 31 outputs a detection signal indicating underinflation if the diameter ratio DF exceeds a threshold L1 stored in a memory (e.g., ROM) in advance. Similarly, the determination unit 31 outputs a detection signal indicating underinflation if the diameter ration DR exceeds a threshold L2 stored in a memory (e.g., ROM) in advance. When the detection signal is output, a warning light embedded in the instrument panel (not shown) is turned on, so that the driver is notified of the insufficient inflation pressure of at least any one of the tires. The threshold L1 and the threshold L2 may be different from each other, or may be the same value.

The sensor output correction unit 32 calculates an average of the offset value of the output of the yaw rate sensor Sγ calculated in the front-wheel least-squares processing unit 27 and the offset value of the output of the yaw rate sensor Sγ calculated in the rear-wheel least-squares processing unit 28, and outputs the average as a correction value. Thus-obtained correction value can be utilized not only for detecting underinflation in the present embodiment, but also for correcting data which are output from the yaw rate sensor Sγ and used in the antilock brake system or other control systems.

Figure 4A:
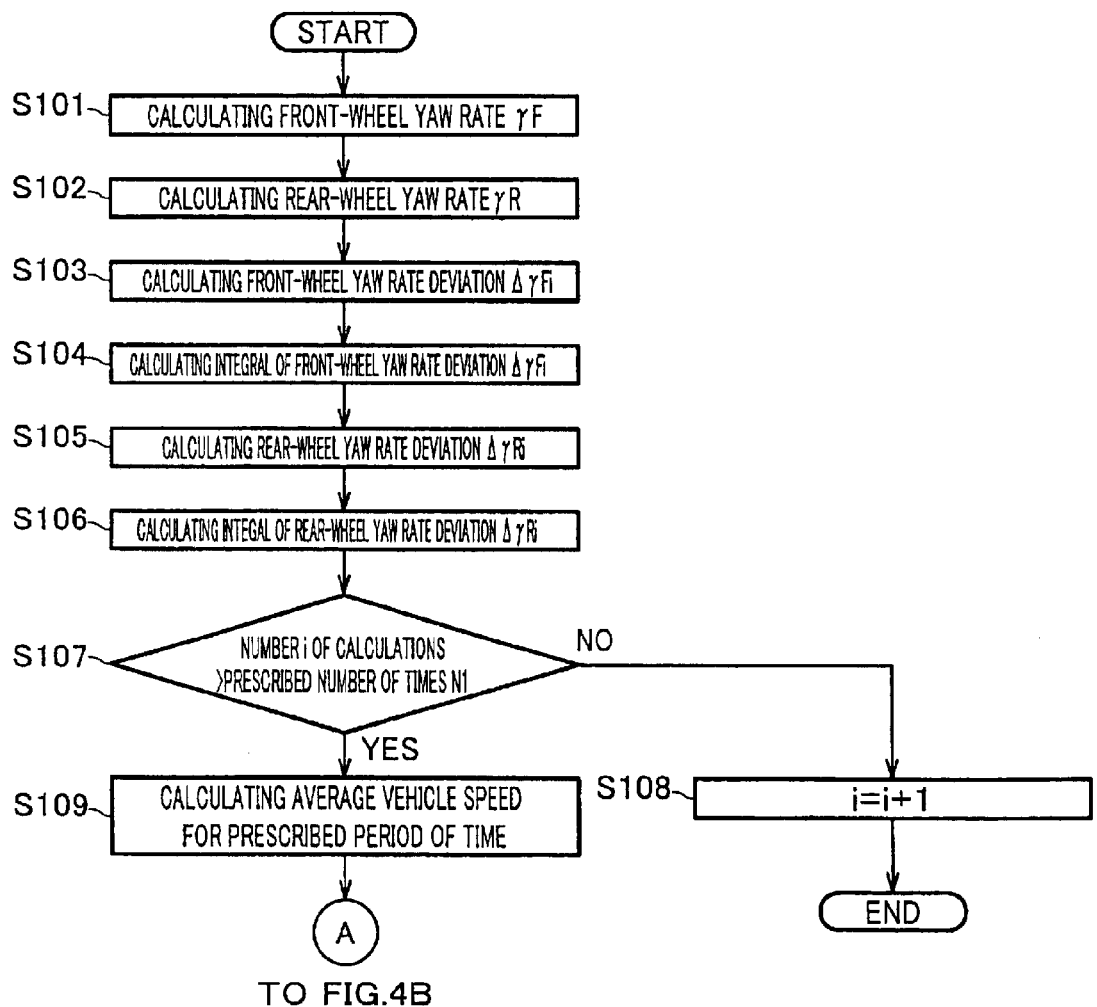
FIGS. 4A and 4B show a flowchart of process steps of underinflation detection and correction of outputs of a sensor according to the present embodiment.
Figure 4B:
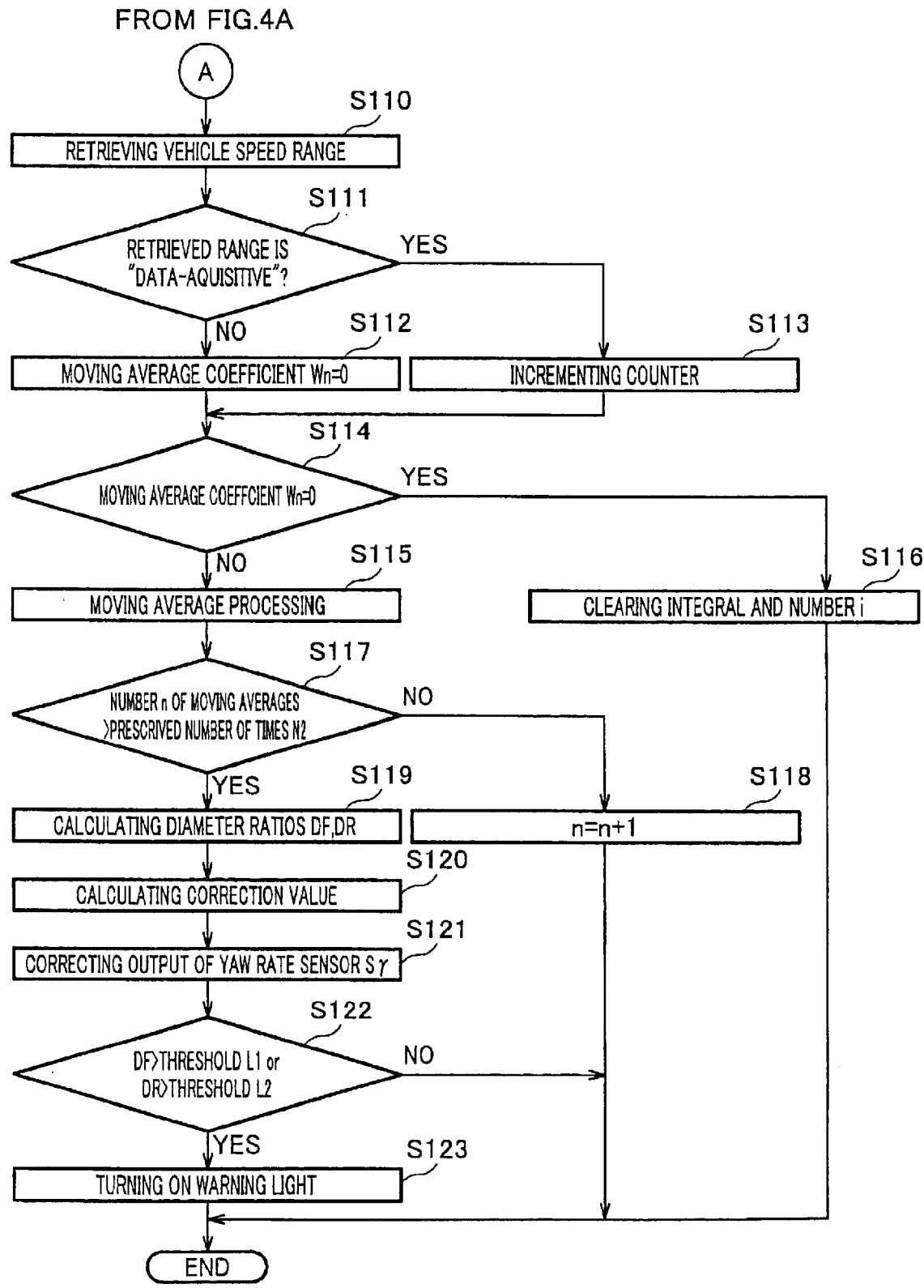

Next, a description will be given of a process flow of underinflation detection and correction of outputs of the yaw rate sensor Sγ with reference to the flowchart shown in FIGS. 4A and 4B and other drawing figures.

First, a front-wheel yaw rate γF derived from a rotational speed difference between the front wheels T1, T2 is calculated in step S101. This process step is performed, using output signals from the rotational speed sensors S1, S2, by the rotation speed calculation unit 21 with a comparator, and vehicle behavior calculation unit 22 of the controller 2 as illustrated in FIG. 2.

In step S102, a rear-wheel yaw rate γR derived from a rotational speed difference between the rear wheels T3, T4 is calculated. This process step is performed, using output signals from the rotational speed sensors S3, S4, by the rotation speed calculation unit 21 with a comparator, and vehicle behavior calculation unit 22 of the controller 2 as illustrated in FIG. 2.

A deviation of the front-wheel yaw rate γF from an output of the yaw rate sensor Sγ is calculated in step S103, and the resultant front-wheel yaw rate deviation ΔγFi is added to a preceding value stored in a memory (e.g., RAM) in step S104, to calculate an integral which is output as a front-wheel yaw rate deviation ΔγFn.

Similarly, a deviation of the rear-wheel yaw rate γR from the output of the yaw rate sensor Sγ is calculated in step S105, and the resultant rear-wheel yaw rate deviation ΔγRi is added to a preceding value stored in a memory (e.g., RAM) in step S106, to calculate an integral which is output as a rear-wheel yaw rate deviation ΔγRn.

The front-wheel yaw rate deviation ΔγFi and the rear-wheel yaw rate deviation ΔγRi are calculated repeatedly as in steps S101–106 until the number of times calculated i exceeds a prescribed number of times N1; i.e., unless the number of times i exceeds the prescribed number of times N1 in step S107, the process goes to step S108 in which the number of times i is incremented by one, and then the process goes to an end. The process steps S101–106 are repeated at prescribed intervals of time (e.g., every 10 ms) until the condition in step S107 is satisfied.

The prescribed number of times N1 is the number of times such that the total of the above intervals of time falls from one to a few seconds (e.g., the number of times equivalent to a one-second period of time when the process is performed at intervals of every 10 ms is one hundred), and if the number of times i exceeds the prescribed number of times N1, the process goes to steps S109.

In step S109, an average vehicle speed for each prescribed period of time (hereinafter referred to simply as vehicle speed Vv) is calculated. The prescribed period of time is a period of time obtained by multiplying the prescribed number of times N1 and the prescribed intervals of time together. Mean values of the rotational speeds V1–V4 of the front wheels T1, T2 and the rear wheels T3, T4 may be employed as the vehicle speeds Vv, but any other operations for obtaining the vehicle speeds Vv, such as using outputs of the vehicle speed sensor, may also be employed.

Next, a vehicle speed range within which the calculated vehicle speed Vv falls is retrieved in step S110, and if it is determined in step S111 that the counter (i. e., a value held in a data field for the counter) corresponding to the pertinent vehicle speed range is indicative of a "non-data-acquisitive" condition, then the process goes to step S112, in which "0"(zero) is set to the moving average coefficient Wn. On the other hand, if it is determined in step S111 that the counter is indicative of a "data-acquisitive" condition, then the process goes to step S113 in which a value calculated in a prescribed manner as described above is set to the moving average coefficient Wn, and the value in the data field for the counter is incremented. Once the value in the data field for the counter reaches a predetermined value, the counter is turned into a "non-data-acquisitive" condition in which the counter is not incremented and the data received when the vehicle speed Vv falls within the vehicle speed range is not acquired for subsequent operations until the counters is reset. These process steps S110–112 are performed in the speed range determination part 23a as described above, where control is exercised over the vehicle speed ranges, counters corresponding to the vehicle speeds, and values written in the data field for the counter, to correct a moving average coefficient Wn.

In step S114 which follows step S112 or S113 as above, the moving average coefficient Wn is checked, and if it is determined that the moving average coefficient Wn is not equal to "0"(zero), then the process goes to step S115 in which the moving average processing is performed. On the other hand, if it is determined that the moving average coefficient Wn is equal to "0"(zero), then the data fields for the integrals of the front-wheel yaw rate deviation $\Delta\gamma Fn$ and the rear-wheel yaw rate deviation $\Delta\gamma Rn$, and the number of times i are all cleared, and the process goes to an end.

The moving average processing in step S115 is performed by multiplying the front-wheel yaw rate deviation $\Delta\gamma Fn$ and the rear-wheel yaw rate deviation $\Delta\gamma Rn$ respectively by the moving average coefficient Wn, and adding the results to the previous values. The moving average processing is repeated until the condition as represented in step S117 is satisfied, i.e., the number of times n of moving averages exceeds a prescribed number of times N2. Unless the number of times n of moving averages exceeds the prescribed number of times N2, the process goes to step S118, in which the number of times n of moving averages is incremented by one, and goes to an end.

If the number of times n of moving averages exceeds the prescribed value N2 (i.e., YES in step S117), the process goes to step S119 in which a diameter ratio DF is calculated from the rate of change of the front-wheel yaw rate deviation $\Delta\gamma Fn$ with respect to change of the vehicle speed Vv obtained by the least-squares method, and a diameter ratio DR is calculated from the rate of change of the rear-wheel yaw rate deviation $\Delta\gamma Rn$ with respect to change of the vehicle speed Vv obtained by the least-squares method. Subsequently, an offset value of the output of the yaw rate sensor S$\gamma$ obtained through the least-squares estimate for the front wheels T1, T2, and an offset value of the output of the yaw rate sensor S$\gamma$ obtained through the least-squares estimate for the rear wheels T3, T4 are averaged to calculate a correction value (in step S120), thereby correcting the output of the yaw rate sensor S$\gamma$.

In step S122, comparisons are made between the diameter ratio DF and a threshold L1, and between the diameter ratio DR and a threshold L2. If it is determined in step S122 that the diameter ratio DF or the diameter ratio DR is greater than the threshold L1 or the threshold L2, respectively, it is determined that inflation pressure of a tire of any of the wheels has decreased, and a warning light is turned on in step S123. On the other hand, if it is determined in step S122 that the diameter ratio DF and the diameter ratio DR are not greater than the threshold L1 and the threshold L2, respectively, the process goes to an end.

A specific interval of processing time after the process comes to an end, the same process starts again from step S101, in which integrals of yaw rate deviations $\Delta\gamma Fi$, $\Delta\gamma Ri$ are calculated by the prescribed number of times N1 and moving averages thereof are taken. At this stage, the number of times of moving averages exceeds the prescribed number of times N2, and thus newly calculated yaw rate deviations $\Delta\gamma Fn$, $\Delta\gamma Rn$ as well as the previously calculated yaw rate deviations $\Delta\gamma Fn$, $\Delta\gamma Rn$ are used to calculate diameter ratios DF, DR and offset values. As a result, underinflation of tires is detected from the diameter ratios DF, DR, and an output of the yaw rate sensor S$\gamma$ is corrected from the offset values.

According to the present embodiment of the underinflation detector 1 as described above, comparisons are made between actually detected values of the yaw rate sensor S$\gamma$ and calculated values of the front-wheel yaw rates $\gamma F$ which are presumed to take place in the front wheels T1, T2, and between actually detected values of the yaw rate sensor S$\gamma$ and calculated values of the rear-wheel yaw rates $\gamma R$ which are presumed to take place in the rear wheels T3, T4, so that underinflation of tires of the wheels can be detected. This approach makes it possible to detect underinflation of tires of any of the four wheels even when inflation pressure of only one tire has decreased, and even when the inflation pressure of one tire of the front wheels T1, T2 and one tire of the rear wheels T3, T4 has decreased. Further, the underinflation detector 1 according to the present embodiment can detect underinflation even when tires of the two wheels at the same sides (i.e., the front and rear left wheels T1, T3, or the front and rear right wheels T2, T4) undergo decrease of inflation pressure at the same time. The use of the least-squares method in the present embodiment of the underinflation detector 1 serves to remove a zero-point drift which would take place in the output of the yaw rate sensor S$\gamma$, thereby making the detection more accurate. Moreover, correction can be made to the outputs of the yaw rate sensor S$\gamma$. From the viewpoint of this sensor output correction feature, the underinflation detector 1 according to the present embodiment may be referred to as a correction device for outputs of the yaw rate sensor S$\gamma$.

Although the preferred embodiments of the present invention have been described above, various modifications and changes may be made in the present invention without departing from the spirit and scope thereof.

For example, the above embodiment adopts a yaw rate as a parameter related to the direction of movement of a vehicle; thus, the underinflation detector 1 includes a yaw rate sensor S$\gamma$, and obtains deviations from the front-wheel yaw rate $\gamma F$ and rear-wheel yaw rate R$\gamma$ each calculated from the rotational speeds V1–V4. It is however understood that the parameter may be a steering angle. In this variation, a steering angle sensor S$\delta$ is used to detect a steering angle as an actually measured value, and an estimated steering angle $\delta$ for the front wheels T1, T2 and an estimated steering angle $\delta$ for the rear wheels T3, T4 are calculated from the rotational speeds V1–V4, so that a deviation of the estimated steering angle $\delta$ for the front wheels T1, T2 from the actually detected steering angle and a deviation of the estimated steering angle $\delta$ for the rear wheels T3, T4 from the actually detected steering angle are obtained. Alternatively, the parameter may be a lateral acceleration, and a lateral acceleration sensor SG may be used to detect a lateral acceleration as an actually measured value, where a deviation of an estimated lateral acceleration G for the front wheels T1, T2 and a deviation of an estimated lateral acceleration G for the rear wheels T3, T4 from the actually detected lateral acceleration are obtained. These alternative embodiments also can detect underinflation of tires of the wheel and can correct the outputs of the steering angle sensor Sδ or the lateral acceleration sensor SG as the above-illustrated embodiment. The steering angle sensor Sδ and the lateral acceleration sensor SG may need correction for some instances due to stress applied on attachment and/or zero-point drift, etc., and the correction in the outputs of these sensors made according to the present invention makes it possible to obtain adequate value from actual detection of each sensor.

In cases where the underinflation detector 1 includes sensors that can detect parameters for determining the moving average coefficient Wn, each parameter may be determined without using rotational speeds V1–V4 of the wheels T1–T4. Moreover, the parameters available in the present invention may include a vehicle speed, acceleration, engine torque, engine rpm, gearshift position, and the like. These parameters serve to determine if the vehicle speed falls within a steady-state range, and can thereby determine the behavior, other than the direction of movement, such as an acceleration state, of the vehicle. Not every parameter as mentioned above need be employed. Two or more of parameters of different kinds may be employed in combination such that a parameter indicating a direction of movement of the vehicle and another parameter indicating an acceleration condition can be obtained to determine two separate moving average coefficients, which may both be used to weight diameter ratios Dn in the moving average calculation unit.

In conclusion, the present invention provides an underinflation detector that can detect insufficiency of inflation pressure of tires of the front wheels and insufficiency of inflation pressure of tires of the rear wheels independently by comparing values calculated from rotational speeds or the like with values actually detected by a sensor. Accordingly, detection can occur without fail even when the inflation pressure of only one tire among four has decreased, and even when the inflation pressures of one tire of the front wheels and one tire of the rear wheels have decreased at the same time. Further, the detection can be made without fail even when the inflation pressures of the two wheels at the same sides have decreased at the same time. Furthermore, using offset values obtained through operation of detecting insufficiency of inflation pressure of tires of the vehicle, the outputs of the sensor can be corrected appropriately as necessary.

What is claimed is:

1. An underinflation detector for a four-wheeled vehicle comprising:

a driving direction sensor that detects a direction of movement of the vehicle and outputs a detected value as a first value of a parameter related to the direction of movement of a vehicle;

a rotational speed sensor that detects rotational speeds of two front wheels and two rear wheels of the vehicle; and a controller that determines from outputs of the driving direction sensor and the rotational speed sensor whether inflation pressure of a tire of any of the wheels has decreased, wherein the controller obtains the first value of the parameter from the driving direction sensor, calculates a second value of the parameter from a difference between rotational speeds of the front wheels, calculates a third value of the parameter from a difference between rotational speeds of the rear wheels, calculates a rate of change of deviation of the second value from the first value with respect to change of vehicle speed by the least-squares method, calculates a rate of change of deviation of the third value from the first value with respect to change of the vehicle speed by the least-squares method, and if at least one of the rates of change of deviation exceeds a prescribed threshold, determines that inflation pressure of a tire of at least one of the wheels has decreased.

2. An underinflation detector according to claim 1, wherein the deviations are modified by being weighted by normalized values of indicators of straight-ahead driving of the vehicle and taking moving averages thereof before the rates of change of the deviation are calculated with respect to change of the vehicle speed by the least-squares method.

3. An underinflation detector according to claim 1, wherein the parameter related to the direction of movement of the vehicle is one selected from the group consisting of a yaw rate, a steering angle, and a lateral acceleration.

4. A sensor output correcting method using the underinflation detector according to claim 1, comprising the steps of:

calculating a first offset value of outputs of the driving direction sensor from a relation obtained by the least-squares method between the deviation of the second value from the first value and the vehicle speed;

calculating a second offset value of the outputs of the driving direction sensor from a relation obtained by the least-squares method between the deviation of the third value from the first value and the vehicle speed; and obtaining from the first offset value and the second offset value a correction value to be added to the outputs of the driving direction sensor.

* * * * *